May 18, 1965 G. S. LYCHYK ETAL 3,184,656
RELAY ARMATURE BEARING ASSEMBLY
Filed Oct. 9, 1961
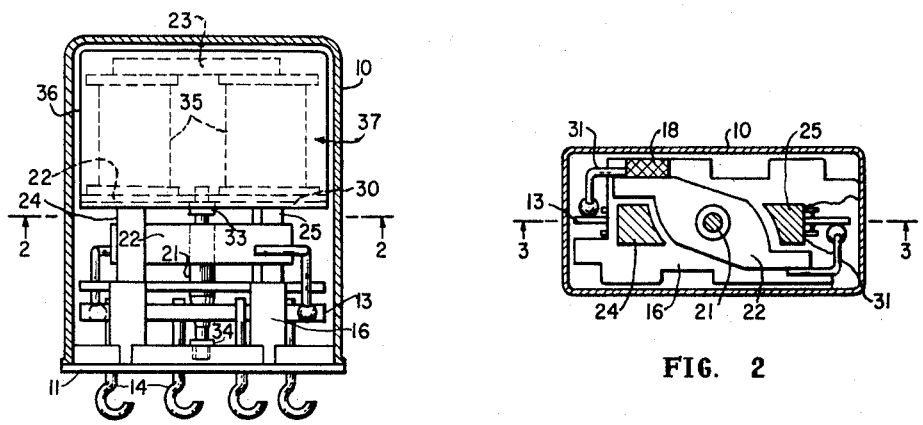
FIG. 1
FIG. 2
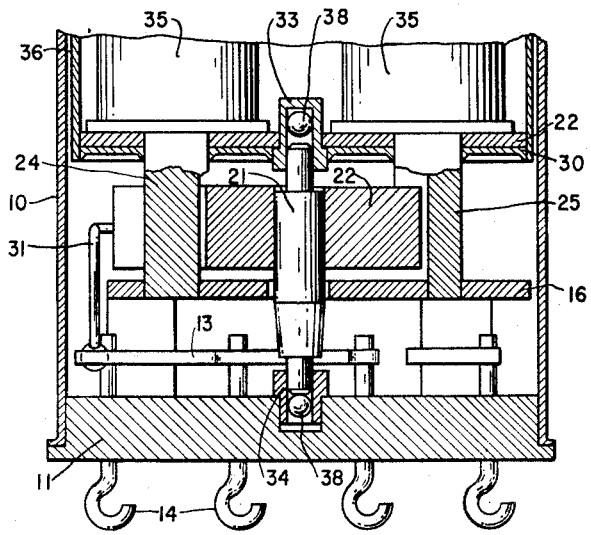
FIG. 3
INVENTORS.
GEORGE S. LYCHYK
JOHN M. LORD
WAYNE E. NEESE
BY
ATTY.

3,184,656
RELAY ARMATURE BEARING ASSEMBLY
George S. Lychyk, Cicero, John M. Lord, Oak Park, and Wayne E. Neese, Chicago, Ill., assignors to Automatic Electric Laboratories Inc., Northlake, Ill., a corporation of Delaware
Filed Oct. 9, 1961, Ser. No. 143,701
3 Claims. (Cl. 317—197)

This invention relates to armature bearing assemblies for electrical relays known as High-G relays. A relay of this general type has been disclosed, for example, in U.S. Patent 3,109,903, filed August 4, 1960, Miniature Relays, Lychyk. More particularly the invention relates to an armature bearing assembly wherein shock, vibration and friction effects are negligible.

The armature bearing assembly in the above type relays constitutes an appreciable factor in the overall operating characteristics of the relay. Thus, any improvement in the armature bearing assembly is desirable and is of particular importance in the applications in which these relays are commonly used.

Heretofore, the armature bearing assemblies used in this type relay consisted of, for example, an armature which rotated on a fixed pin. The pin was secured at one end to some part of the relay structure. An appreciable amount of friction developed between the fixed pin and the moving armature and between the bottom surface of the armature and the surface to which the pin was mounted. Also, in the cases where the pin was fixed at one end only, vibration frequencies would be noticeable and affect the relay operation.

The present invention discloses a particular armature bearing arrangement which increases the sensitivity and reliability of the relay.

The principal object of the invention is to provide a low-friction end support for the armature shaft of a relay.

Another object of the invention is to provide a method and means for accurately sizing the bearing surfaces.

Still another object of the invention is to provide an armature bearing wherein the end play of the shaft is controlled and held constant.

With these objects in mind the invention features an armature bearing arrangement which comprises an armature which is rigidly mounted to a shaft. The shaft is of varied diameter and rotates within two bearing sleeves positioned at its ends. Pressed within each bearing sleeve, adjacent the ends of the shaft, is a steel ball which "sizes" the respective bearing hole for the shaft, takes up the end play of the shaft, and also acts as a thrust bearing therefor.

These and other objects and features of the invention will become more apparent from the following detailed description taken in connection with the accompanying drawings of which:

FIG. 1 is an elevational view of the particular type relay for which the armature bearing assembly is designed.

FIG. 2 is a sectional view of FIG. 1 taken along line 2—2.

FIG. 3 is an elevational view taken substantially along line 3—3 of FIG. 2 and showing in detail the armature bearing assembly as taught by the invention.

Referring now to the drawings and in particular to FIGS. 1 and 2 thereof, the above mentioned type relay in which the armature bearing arrangement of the invention can be used comprises in general: coil means encapsulated within a metallic enclosure 37, a substantially U-shaped electromagnetic core structure 23, an armature bearing arrangement described in greater detail below, a header plate 11, and an outer casing 10. More particularly, the coil means includes two coils 35 which are placed on two pole pieces 24 and 25. The coils and the base portion of the core structure 23 are encapsulated in an air tight metallic enclosure 37. The enclosure comprises a pot 36 and a closure plate 22. The closure plate has three apertures: two apertures receive the ends of the pole pieces 24 and 25, and the third aperture receives a bearing cup 33. To keep the enclosure 37 air tight the adjoining seams must be filled with solder. According to one embodiment this is accomplished by placing plate 30, made of a solder material, adjacent the closure plate 22 and subjecting the combination to heat. This results in solder flowing into the respective seams and sealing the coils to an extent that any gases which may emanate from the coils are contained within the enclosure 37 and will not contaminate the contacts of the relay. Header plate 11 is used to close the normally open end of outer casing 10 which is placed over the enclosure 37. Furthermore, the header plate 11 supports terminal posts 14 which extend from the inside of the relay to the outside of the relay. On the inwardly extending ends the relay contact springs 13 are mounted. The externally extending ends serve as the means for connecting the relay to an external circuit.

Contacts springs 13 are actuated by actuator pins 31 which are mounted to the two arms of armature 22. Actuation occurs when the aforementioned coils are energized creating an electro-motive force about the armature causing it to move. This movement is appreciably facilitated by the improved armature bearing arrangement described in greater detail below. The low-friction, stable arrangement requires a minimum force to overcome inertia and the relay's overall operation becomes more sensitive, more responsive to a surge of current. Moreover, by virtue of the shaft being supported at two ends at a distance from the armature itself negligible vibration is incurred during the most adverse condition to which the relay may be subjected.

Referring now to FIG. 3 of the drawings. The armature bearing arrangement according to the invention comprises: a balanced armature 22 rigidly fixed to the intermediate portion of the shaft 21, two bearings, one a bearing cup 33 and the other a bearing sleeve 34, and two steel balls 38 which are inserted within the holes of the two bearings. The shaft extends between the coil enclosure 37 and the header plate 11. At a point intermediate the two ends the shaft goes through, with clearance therebetween, frame structure 16. More particularly, the shaft lies along the central axis of the relay and is supported by bearing cup 33, disposed within enclosure 37, or more specifically closure plate 22, and bearing sleeve 34 disposed within header plate 11. The diameter of the shaft at its ends is reduced to a slightly smaller size than the center portion of the shaft. This reduces the actual bearing area and thus the frictional effects upon the rotation of the shaft itself.

The bearings are sized according to the invention by forcing the steel balls, which are slightly larger than the openings of the sleeves, into the bearing holes. This expands the bearings to substantially the diameter of the steel balls and to a diameter where the journaled end of the shaft can properly rotate therein. It is in this manner then that the bearings are sized and proper, consistent shaft-bearing relationship achieved.

It is to be noted that the steel balls 38 are not forced to the base of the bearing hole but some place intermediate the ends. This affords the arrangement with an adjustment feature, for the steel ball or balls can be moved to compensate for a plus or minus tolerance without losing its effectiveness as a bearing. In this manner also the end play of the shaft is controlled. The cumulative clearance between the steel balls and the ends of the shaft thus are substantially constant.

Another feature of the steel balls is that they act as thrust bearings. This action is virtually without friction as the maximum contact between the end of the shaft and the steel balls is "point" contact.

The assembling of the bearing arrangement involves inserting bearing cup 33 in the provided aperture of the closure plate 22. After insertion the cup is sealed to the closure plate by the aforementioned soldering operation. Hereafter the respective steel ball is pressed into the bearing cup to size the hole for the respective end of the shaft. In a similar fashion sleeve bearing 34 is inserted into the header plate 11 and a steel ball pressed into the sleeve. This is followed by positioning the shaft with the armature 22 fixed thereto into the two sleeves.

It is to be noted that bearing sleeve 34 is placed into a blind hole of the header plate 11 and that bearing cup 33 is placed into an aperture in enclosure 37. The bearing cup 33 provides a seal for the coil means once it is soldered by virtue of its cup-shaped configuration. This seal is automatically accomplished in the case of the sleeve 34 by virtue of the blind hole in which the sleeve is placed.

One embodiment of the invention has been shown and described in detail, however, it is to be understood that this was done by way of example only and that a number of variations in the structure and arrangement of the invention can be made without departing from the spirit and scope of the invention as hereinafter claimed.

What is claimed is:

1. An armature bearing assembly for an electrical relay comprising: a pair of one piece sleeves each with an internal bearing surface, said sleeves being spaced from each other and mounted in said relay; a shaft having ends rotatably supported by said sleeves at said bearing surfaces thereof; a pair of steel balls positioned within said sleeves and in such relationship to the ends of said shaft to provide a thrust bearing therefor and also to size said sleeves for reception of the ends of said shaft; and an armature carried by said shaft.

2. An armature bearing assembly for an electrical relay having coil means sealed within a metallic enclosure and mounted on an electromagnetic core structure, a balanced armature rotatable on a central axis of said relay, and a header plate in which is mounted the contact springs, said assembly comprising: a first and second one piece bearing sleeve each having an internal bearing surface, said first sleeve being mounted to said enclosure and said second sleeve being mounted to said header plate; a shaft carrying said armature and having ends rotatably supported by said sleeves at said bearing surfaces thereof; and pair of steel balls positioned within said sleeves and in such relationship to the ends of said shaft to provide a thrust bearing therefor and also to size said sleeves for reception of the ends of said shaft.

3. An armature bearing assembly as claimed in claim 2 wherein said first sleeve is substantially cup shaped and disposed in a corresponding size aperture of said enclosure, the diameter of said aperture and the external diameter of said sleeve being such that the said coil means is sealed within said enclosure, and wherein said second bearing sleeve is of a tubular shape and disposed in a corresponding blind hole of said header plate.

References Cited by the Examiner

UNITED STATES PATENTS

| 2,351,588 | 6/44 | Field | 200—87 |
| 2,810,037 | 10/57 | Faus et al. | 317—198 |
| 2,934,621 | 4/60 | Stewart | 200—87 |
| 2,957,965 | 10/60 | Millunzi | 200—87 |

JOHN F. BURNS, *Primary Examiner.*

MAX L. LEVY, *Examiner.*